United States Patent
Hoyt

[11] 3,976,842
[45] Aug. 24, 1976

[54] ANALOG RATE CHANGER

[75] Inventor: Clifton A. Hoyt, Barnes, Wis.

[73] Assignee: Hayward Research, Inc., Hayward, Wis.

[22] Filed: Mar. 10, 1975

[21] Appl. No.: 556,628

[52] U.S. Cl. .......................................... 179/15.55 T
[51] Int. Cl.² ............................................ H04B 1/66
[58] Field of Search ................. 179/15.55 T, 15 A; 235/154; 340/172.5

[56] References Cited
UNITED STATES PATENTS

| | | | |
|---|---|---|---|
| 3,816,664 | 6/1974 | Koch | 179/15.55 T |
| 3,863,026 | 1/1975 | Dildy | 179/15.55 T |

Primary Examiner—Charles D. Miller
Attorney, Agent, or Firm—Wegner, Stellman, McCord, Wiles & Wood

[57] ABSTRACT

An analog rate changer which has a pair of fall-through registers that are controlled to develop analog output signals which bear substantially the same wave shape and amplitude information borne by the analog input signals, but which have a selected greater or lesser frequency spectrum than that of the analog input signals. In a time contraction mode in which the frequency spectrum is reduced, digital signals corresponding to the analog input signals are alternately clocked into the two fall-through registers at a write rate and continuously clocked out of both registers at a read rate which is less than the write rate. In a time expansion mode in which the frequency spectrum is increased, the digital signals are continuously clocked into both registers at a write rate and alternately clocked out of the registers at a read rate which is greater than the write rate. In both modes of operation, both the read rate and the write rate are synchronized with a conversion sampling rate of an A/D converter which produces the digital signals operated on by the fall-through registers. This permits alteration of the conversion sampling rate without alteration of the ratio between the read rate and the write rate. Reduction of the write rate relative to the read rate to reduce the frequency spectrum of the output signal relative to the input signal reduces the write rate relative to the conversion sampling rate. This reduces the proportion of digital signals developed by the A/D converter that are clocked into the registers and permits increasing the conversion sampling rate to maintain the absolute write rate at an optimum level. When the write rate is two times greater than the read rate, the analog outputs from the two registers may be kept separated to provide a stereo effect. Alternately, a mixer circuit is provided to blend the two signals together to provide a single output signal.

25 Claims, 1 Drawing Figure

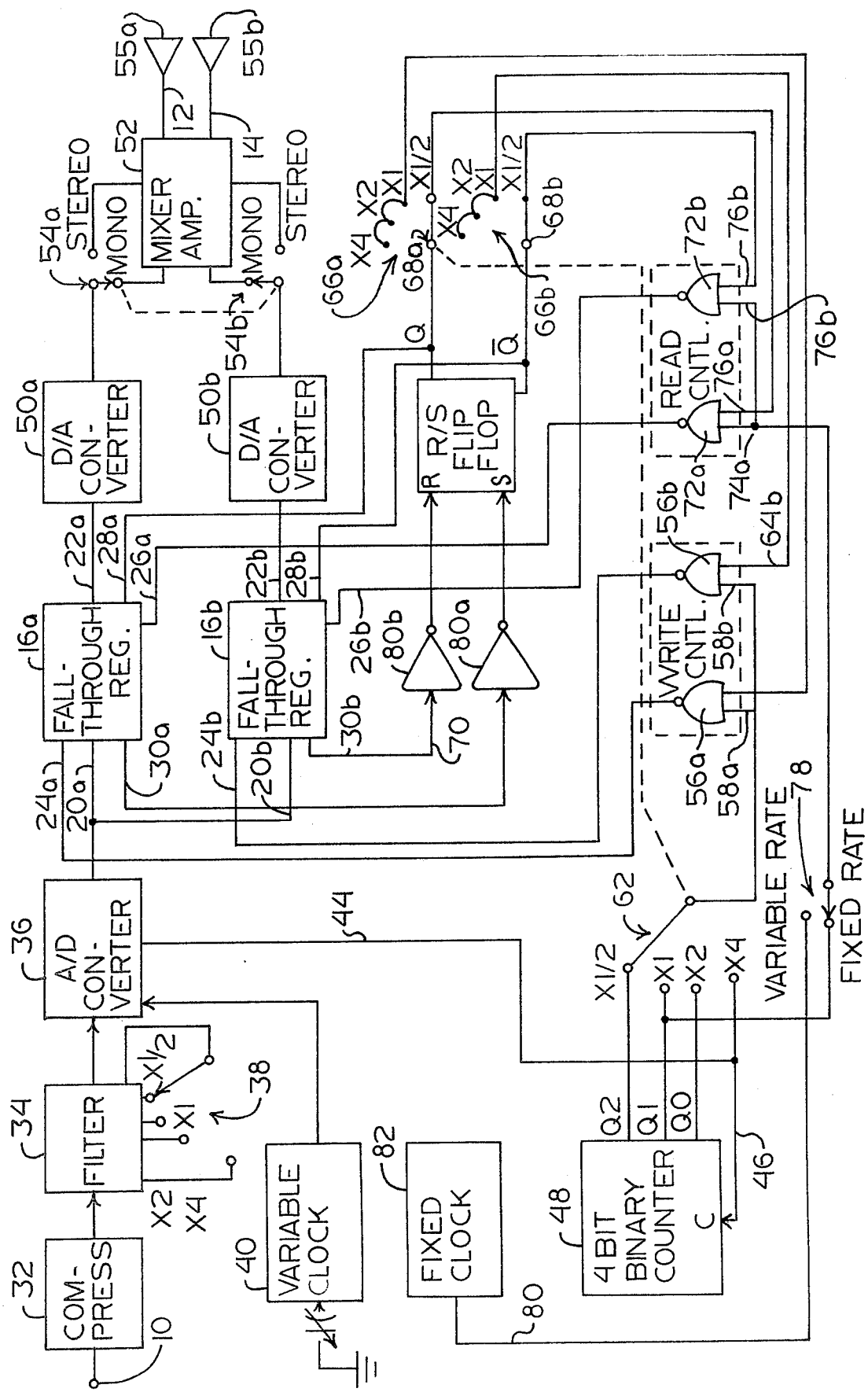

ANALOG RATE CHANGER

BACKGROUND OF THE INVENTION

This invention relates to an analog rate changer for altering the frequency spectrum of audio signals and, more particularly, to an electronic analog rate changer which effects the change in frequency spectrum by controlling storage media of the fall-through register type.

An analog rate changer is a device for altering the frequency spectrum of an analog signal. The most common use for an analog rate changer is the time compression and expansion of prerecorded speech. As discussed in *Time Compression and Expansion of Speech by the Sampling method* by Francis F. Lee in Journal of the Audio Engineering Society, 20(9), pp. 738–742, Nov. 1972, the advantages of using prerecorded speech for information dissemination are numerous. Generally, neither literacy nor sight is required to receive information by this medium. The major disadvantage is that if the prerecorded speech is played back at the same rate at which it is prerecorded, the rate at which the information is received is limited to the rate at which the original speech was produced, which is normally around 110–175 words per minute.

Fortunately, people can listen to and comprehend speech at rates considerably greater than the rates at which words are normally spoken. Thus, the rate at which information can be received by listening to playback of prerecorded speech can be increased simply by playing back the prerecorded speech at a rate faster than at which it was originally recorded. Unfortunately, as the speed of playback is increased relative to the speed of recording, all of the frequency components of the audio speech signals are proportionately increased, i.e., the pitch or frequency spectrum of the signal is increased. This increase in playback speed distorts the quality of the audio signal, and at a playback speed 1.7 or greater than recording speed, the increased pitch results in a substantial reduction in intelligibility. But for the increased pitch, intelligibility and comprehension could be maintained at much greater relative playback speed. When the playback speed is reduced relative to the recording speed, the frequency spectrum of the audio speech signal is proportionately reduced. The reduced pitch of the speech signal likewise results in deterioration of intelligibility and comprehension.

Various signal processing techniques are known which are designed to reduce the pitch of audio speech signals from a prerecorded medium which is played back at a rate faster than it was recorded and to increase the pitch of the audio speech signal when the prerecorded medium is played at a rate slower than at which the signals were recorded, so that comprehension may be maintained at greater levels of speech compression and expansion.

One known technique of electronic time compression and expansion of speech is discussed in the aforementioned article of Francis F. Lee. In this technique, a pair of analog shift registers are alternately used for input and output purposes with signals being clocked into and out of only one register at a time. When one of the registers is accepting input samples, the other is providing signal samples for output and vice versa. In a time compression mode, the input signals are shifted into the register at a rate faster than at which output signal samples are taken from the other register. A first segment of information which is shifted into the input register at the instant of input-output role switching is lost or discarded, and this discarded interval increases with increases in playback speed. In a time expansion mode, each segment of information is repeated in part through recirculation control of the shift register. Input sampling is at a lower rate than output sampling, and input-output role switching is done when the input register is filled to capacity.

Another technique of time compression and expansion of speech which is discussed in the aforementioned article of Francis F. Lee employs a random access memory. Input samples are located into the memory in succession at one rate and output samples are retrieved at another rate greater or lesser than the input rate, depending upon whether time expansion or time compression is desired.

Various techniques are shown in U.S. Pat. No. 3,786,195 of Schiffman, some of which employ a variable delay line, some of which utilize digital shift registers, and one of which utilizes a random access memory.

Apparatus for audio signal time compression and expansion employing a delay line is likewise shown in U.S. Pat. Nos. 3,594,513 and 3,480,737 of Greenberg et al.

SUMMARY OF THE INVENTION

Advantages over the known apparatus for time compression and time expansion of analog signals are provided by the analog rate changer of the present invention which achieves the desired alteration in the frequency spectrum of the input signals by controlling input to, and output from, a plurality of serial fall-through registers, which are serial digital registers capable of simultaneously providing output signals while input signals are being entered thereinto at a rate independent of the rate at which the digital signals are entered. Once a digital signal is entered into an initial word location or cell of a register, it automatically falls through or propagates through the register toward the output and is stored in the last empty cell of the register. The analog input signals are first converted by an A/D converter to digital words at a sampling rate established by a variable clock before being entered into the registers. The output signals from the fall-through registers are separately converted to corresponding analog output signals. The analog output signals may be separately converted into audible speech by suitable transducers or mixed together to form a single analog output signal before being converted into audible sound. In the preferred embodiment, only two fall-through registers are employed.

In a time compression mode in which the frequency spectrum of the analog input signals is lowered, the digital signals are alternately clocked into the two registers at a write rate while the stored digital signals therein are continuously removed from both registers at a read rate less than the write rate. Simultaneous removal of the digital signals from both registers rather than from just one register at a time, as in the known systems, decreases the amount of information that must be discarded to achieve a given decrease in frequency spectrum, which improves the quality of sound reproduction and enhances intelligibility.

In the time expansion mode in which the frequency spectrum is raised, the digital signals from the A/D converter are continuously clocked into both of the registers while the stored digital signals therein are alternately clocked out of the two registers. The digital signals are clocked out at a read rate which is greater than the write rate at which the digital signals are clocked into the registers. Simultaneous entry of digital signals into both of the fall-through registers eliminates the need for recirculation control of a pair of registers required by the known systems of this general type.

Circuitry is provided to select different ratios between the read rate and the write rate so that different changes in the frequency spectrum corresponding thereto may be achieved. At any selected ratio, both the read rate and the write rate are synchronized with the rate at which the A/D converter converts the analog input signals to corresponding digital signals and presents them to the fall-through register. Means are further provided to proportionately vary the absolute values of the read rate and the write rate so that the conversion sampling rate, and thereby the time duration of one cycle of operation of the registers and the time duration of any discarded segments of information may be varied to optimize the output signals without altering the change in pitch effected by the analog rate changer.

A further advantageous feature of the present invention is the provision of switching circuitry for reducing the write rate relative to the rate at which digital signals are developed by the A/D converter as the write rate relative to the read rate is reduced. As the ratio of the write rate to the read rate is decreased, the percentage of digital signals presented by the A/D converter that are clocked into the register is reduced. Reducing the write rate by reducing the percentage of presented digital signals that are entered into the fall-through registers narrows the range of conversion sampling rate needed for a given range of write rate to read rate ratios. The conversion sampling rate need not be decreased to lower the write rate to read rate ration and, in fact, may be increased to maintain a short time duration of discarded information segments even at the lower ratios. This facility both improves the accuracy of the conversion and reduces the chance of discarding substantial portions of the speech information and thereby improves the analog output signal quality.

The foregoing advantageous features of the analog rate changer will be made more apparent and further advantages will be appreciated from the following description of the preferred embodiment.

DESCRIPTION OF THE DRAWING

The description of the preferred embodiment is taken in conjunction with the drawing which is a schematic block diagram of a preferred embodiment of the analog rate changer of the present invention.

DESCRIPTION OF THE PREFERRED EMBODIMENT

Referring to the drawing, the analog rate changer is designed to process an analog audio input signal at its input 10 to produce an analog audio output signal on outputs 12 and 14 having the basic audio information of the input signal but having an overall higher or lower frequency spectrum or pitch than the input signal.

The analog rate changer may be operated in either a time compression mode or a time expansion mode. In the time compression mode, the frequency response of the input audio signal is lowered, and in the time expansion mode, the frequency response is increased. It is intended that the audio input signal be provided from a storage medium on which audio signals have been prerecorded. A suitable source of input signals is that provided when a magnetic tape having prerecorded audio signals thereon is played. In using the analog rate changer in its time compression mode, the prerecorded tape is played at a rate faster than that at which it was recorded, and the frequency spectrum is lowered by a corresponding amount so that it is substantially the same as that of the original audio signal which was recorded. Likewise, when the audio input signals are provided by a prerecorded tape which is played at a rate slower than that at which the audio signals were recorded to lower the rate at which the information is presented, the analog rate changer is operated in a time expansion mode to increase the frequency spectrum by a corresponding amount so that the output signal has substantially the same frequency spectrum as that of the original audio signal which was recorded.

This processing result is achieved through control of the input, output and clearing functions of a pair of substantially identical fall-through registers 16a and 16b. Each of these fall-through registers has the capacity for serially storing 128 eight-bit digital words. Fall-through register 16a has eight data inputs 20a, a corresponding eight data outputs 22a, a data write input 24a, a data read input 26a, a reset input 28a and a full flag output 30a. Fall-through register 16b also has eight data inputs 20b, eight data outputs 22b, a write input 24b, a read input 26b, a reset input 28b and a full flag output 30b.

Registers 16a and 16b are referred to as fall-through registers because once a data word is entered into an initial word location or cell of the register, it automatically falls through or propagates through the register toward the output until a cell already containing data is reached. This propagation of the data through the fall-through register is independent of both the rate at which data is clocked into the register and the rate at which data is clocked out of the register. Thus, data may be clocked into the register at a rate greater or lesser than the rate at which data is clocked out of the register. Thus, if data is clocked into the fall-through register at a rate greater than the rate at which data is clocked out of the register, data will stack up at the end of the register while empty word locations or cells will "bubble" to the front or input end of the register.

During operation of fall-through register 16a, for instance, an eight-bit data word on data inputs 20a is entered into the first or input cell of the register each time a write command pulse is coupled to data write input 24a. The digital word stored in the last cell of the register is clocked out of the register on data outputs 22a each time a read pulse is coupled to data read input 26a. When all 128 word cells are filled, a full flag signal on the full flag output 30a is generated to indicate same. All 128 word cells are cleared, if a reset pulse is coupled to reset input 28a. Fall-through register 16b operates in identical fashion.

Fall-through registers 16a and 16b may be constructed in a variety of ways, and so long as the registers have the operating characteristics noted above, the particular design is of little importance. However, the fall-through registers 16a and 16b may easily be constructed from four 3341 silicon gate MOS integrated circuit packages manufactured by the Semiconductor Division of Fairchild Camera & Instrument Corporation, each of which is described as a 64-word × 4-bit, first-in, first-out serial memory. Two pairs of parallel connected 3341 integrated circuit memories are connected in cascade to form each of the 128-word × eight-bit fall-through registers 16a and 16b. The time it takes for a word to propagate through a fall-through register of this size constructed from the 3341 integrated circuit memory is on the order of 20 microseconds.

The audio input signals applied to input 10 are processed by a compressor 32, a filter 34 and an analog-to-digital signal converter 36 before being applied to data inputs 20a and 20b. Compressor 32 functions to compress or limit the amplitude of the analog audio signals at audio input 10 to a level suitable for the analog-to-digital converter 36. The limited analog signals form compressor 32 are coupled to the input of filter 34 which functions to eliminate unwanted higher harmonics by removing signals having a frequency greater than the high frequency limit of the A/D converter 36. Filter 34 also functions to eliminate lower frequency signals which, if permitted to pass to the A/D converter 36, would result in a garbled signal on the output of fall-through registers 16a and 16b. Within these limits, filter 34 passes the analog audio signal in the frequency band corresponding to those in the audible vocal range of the audio signal as originally recorded.

The actual frequencies corresponding to those in the audible vocal range as originally recorded increase when the prerecorded audio signals are played back as a faster rate than that at which they were recorded, and decrease when played back at a slower rate than that at which originally recorded. Accordingly, a four-position switch section 38 of a four-section ganged rate control switch is provided to adjust the actual level of the band pass frequencies of filter 34 in accordance with selected changes in the rate of operation controlled by the other three sections of the rate control switch. The switch section 38 connects different valued band pass limit establishing elements of the filter when in its different positions that are appropriate to the selected rate of operation.

The filtered and compressed analog audio input signal is coupled to the input of A/D converter 36 which converts the analog signal into a series of eight-bit digital words which are respectively coupled both to the eight data inputs 20a of register 16a and the eight data inputs 20b of register 16b. The A/D converter 36 performs the conversion at a conversion sampling rate which is established by a variable clock 40. Variable clock 40 is a free-running oscillator that produces an alternating clock signal at a frequency that is manually selectable by means of an adjustable capacitor 42 between 160 kilohertz and 280 kilohertz. The A/D converter 36 produces on its outputs a new eight-bit word for every eight clock pulses from variable clock 40. After every eight clock pulse, A/D converter 36 also generates a conversion complete pulse on an output 44 which is coupled to the clock input 46 of a four-bit binary counter 48 for purposes that will be explained hereinafter.

The particular type of A/D converter that is employed is not critical to the invention, and any type of A/D converter which functions in the manner described above is suitable for use in the analog rate changer. However, preferably A/D converter 36 comprises a successive approximation converter. A suitable converter of this type may be constructed by driving an Am25L02 eight-bit Successive Approximation Register integrated circuit by a μA734 Precision Voltage Comparator, both of which are manufactured by the Semiconductor Division of Fairchild Camera & Instrument Corporation.

The digital output signals from registers 16a and 16b are converted into analog signals by digital-to-analog converters 50a and 50b, respectively. The output analog signals from D/A converters 50a and 50b are both coupled to a mixer amplifier 52 through mono/stereo mode switches 54a and 54b, respectively. When the switches are in the mono positions shown, the mixer amplifier amplifies and mixes the two signals together and provides the mixed amplified audio output signal on one or both of outputs 12 and 14. When the switches are in the stereo positions, the signals are separately amplified and applied to outputs 12 and 14. The signals on outputs 12 and 14 are converted to audible sound by speakers 55a and 55b respectively connected therewith.

The entry of data from A/D converter 36 into fall-through registers 16a and 16b is respectively controlled by write command pulses generated by write control NOR gates 56a and 56b. The output of NOR gate 56a is connected to write input 24a and the output of NOR gate 56b is connected to write input 24b. Each time, and only when, a write command pulse is generated by write control NOR gate 56a, the digital word from A/D converter 36 being presented is entered into register 16a. Likewise, each time, and only when, a write command pulse is generated by write control NOR gate 56b, a new digital word is entered into fall-through register 16b. NOR gate 56a has two inputs 58a and 64a, and NOR gate 56b has two inputs 58b and 64b. Signals coupled to inputs 64a and 64b enable one or both of NOR gates 56a and 56b, respectively, to generate write command pulses in response to pulses coupled to inputs 58a and 58b. The pulses to inputs 58a and 58b are taken from a selected one of the outputs Q2, Q1, or Q0 or the clock input 46 of binary counter 48 through the wiper contact 60 of a rate control switch section 62. These three outputs and the one clock input are respectively coupled to switch contacts labeled $x\frac{1}{2}$, $x1$, $x2$ and $x4$. The clock input 46 is driven by the conversion complete pulse from A/D converter 36. Thus, a write command pulse is generated by each enabled write control NOR gate for every eight, four, two and one conversion complete pulse when the switch section 60 is in the $x\frac{1}{2}$, $x1$, $x2$ and $x4$ position, respectively. The rate control switch section is thus operable to selectively vary the write rate independently of the conversion sampling rate.

The signals to enabling control inputs 64a and 64b of the write control NOR gates 56a and 56b are taken from the contact positions labeled $x1$, $x2$ and $x4$ of rate control switch sections 66a and 66b, respectively. The wiper contacts 68a and 68b of these switch sections are respectively connected to the normal of Q output and the inverted or $\overline{Q}$ output of monostable multivibrator or RS flip-flop 70. Thus, with rate control switch sections 66a and 66b in either the $z1$, $x2$ or $x4$ position, which are positions for operation in the time compression mode, write control NOR gates 56a and 56b are alternately enabled depending upon the state of RS flip-flop 70. When RS flip-flop 70 is in its set state, with its Q output being in a logic 1-state and its $\overline{Q}$ output being in its logic 0-state, write control NOR gate 56b is enabled to generate write command pulses in response to the pulses from the selected output of binary counter 48 and write control NOR gate 56a is disabled from generating pulses. With RS flip-flop 70 in its reset state, write control NOR gate 56a is enabled and write control NOR gate 56b is disabled. With rate control switch sections 66a and 66b in the x½ position, which is the position for operation in the time expansion mode, enabling control inputs 65a and 64b are disconnected from the output of RS flip-flop 70, and both write control NOR gates are continuously and simultaneously enabled to generate write command pulses to their registers. Thus, when the analog rate changer is operating in a time compression mode, the digital signals are alternately entered into the two fall-through registers and when operating in a time expansion mode, the digital signals are continuously entered into both fall-through registers.

Provision of output signals by fall-through registers 16a and 16b is respectively controlled by read control NOR gates 72a and 72b. The output of NOR gate 72a is connected to read command input 26a of fall-through register 16a, and stored digital words are clocked out of fall-through register 16a in response to read command pulses from read control NOR gate 72a. Stored digital words are clocked out of fall-through register 16b under control of NOR gate 72b in the same fashion. NOR gates 72a and 72b generate read command pulses in response to signals coupled to inputs 74a and 74b thereof, respectively, when enabled by signals coupled to inputs 76a and 76b thereof, respectively.

Inputs 74a and 74b are both connected through a switch 78 to the output 80 of a fixed clock 82 when switch 78 is in the switch position labeled VARIABLE RATE, and are both connected to the Q1 output of binary counter 48 when switch 78 is in the position labeled FIXED RATE. With switch 78 in the FIXED RATE position, the read command pulses are synchronized with the write command pulses. A fixed ratio between the write rate and the read is selected by positioning rate control switch section 62 and this ratio will be maintained despite variations in the conversion sampling rate that may be made to optimize signal output. The read and write rates are, of course, both synchronized with the rate at which the analog input signals are converted to digital words and proportionately variable therewith and thus with one another. With rate control switch section 62 in the x½, x1, x2 and x4 positions, the ratio of the write rate to the read rate is ½, 1, 2 and 4, respectively.

With switch 78 in the variable rate position, the enabled read control NOR gates generate the read command pulses in response to the output pulses from fixed clock 82 at a rate which is independent of the conversion sampling rate and, thus, independent of the write rate. Fixed clock circuit 82 is any suitable free-running oscillator which generates a periodic pulse signal at a suitable frequency. Thus, by varying the conversion sampling rate by means of variable capacitor 42, the write rate may be varied relative to the read rate to provide ratios between those that may be established by rate control switch section 62 when switch 78 is in the fixed rate position. For example, with rate control switch section 62 in the x1 position, the write rate to read rate ratio may be set to 1½ or any other value between 1 and 2 by appropriate selection of the conversion sampling rate. The variable rate provision may also be employed with the rate control switch section 62 in positions other than only the x1 position.

Enabling inputs 76a and 76b of NOR gates 72a and 72b are respectively connected to the x½ positions of rate control switch sections 66a and 66b. When rate control switch sections 66a and 66b are in their x½ positions, the read control NOR gates are alternately enabled to generate read command pulses under control of RS flip-flop 70, and stored digital signals are alternately removed from fall-through registers 16a and 16b. When rate control switch sections 66a and 66b are in any of the x1, x2 and x4 positions, the enabling inputs 76a and 76b are disconnected from the RS flip-flop. Both write control NOR gates 72a and 72b are continuously enabled, and stored digital signals are continuously and simultaneously removed from both of fall-through registers 16a and 16b at the selected rate.

RS flip-flop 70 is controlled by full flag pulses from outputs 30a and 30b of fall-through registers 16a and 16b. Output 30a is coupled to the set of S input of RS flip-flop 70 through an inverter 80a. Output 30b is coupled through an inverter 80b to the reset of R input. Each time fall-through register 16a becomes filled to storage capacity with digital signals, and has all 128-word locations filled, a full flag pulse is generated on its output 30a, and RS flip-flop 70 switches to its set state. As previously explained, RS flip-flop 70 switching to its set state terminates entry of digital signals to fall-through register 16a and initiates entry of digital signals to fall-through register 16b if the analog rate changer is being operated in a time compression mode. If the analog rate changer is being operated in a time expansion mode, flip-flop 70 switching to its set state terminates removal of digital signals from register 16b and initiates removal from register 16a. When register 16b fills, the full flag pulse therefrom switches RS flip-flop 70 to its reset state. This terminates entry of digital signals into register 16b or terminates removal of storage digital signals from register 16a depending upon whether the analog rate changer is operating in the time compression or time expansion mode.

The resetting or clearing of registers 16a and 16b is also controlled by the switching of RS flip-flop 70. The Q output is connected to reset input 28a of register 16a and the $\overline{Q}$ output is connected to the reset input 28b of register 16b. Each time register 16a fills, the negative transition of the signal connected to the reset input 28b of register 16b clears or empties all of the cells of register 16b. Conversely, each time register 16b fills, all of the cells of register 16a are cleared or emptied. As will be seen, at some rates each register has been emptied before the other is filled, such that a reset pulse is not needed. However, when needed, the reset pulse empties each fall-through register in response to the other fall-through register becoming filled.

The operation of the analog rate changer with the rate control switch sections in the x½, x2 and x4 positions will be described in turn, assuming switch 78 to be in the fixed rate position. With the rate control switch sections in switch position x½, data is alternately removed from registers 16a and 16b at a read rate which is one-fourth of the conversion rate, and continuously entered into both of registers 16a and 16b at a write rate that is one-half the read rate. Only one write command pulse is generated for every eight conversion complete pulses, and thus only every eighth digital word presented by A/D converter 36 is entered into the registers.

Output data is provided by registers 16a and 16b alternately. With RS flip-flop 70 in its set state, a high voltage signal from the Q output is connected to input 76a and NOR gate 72a which disables it from generating read command pulses to register 16a, and thus output signals may not be provided therefrom. The $\overline{Q}$ output connected to input 76b of NOR gate 72b generates a read command pulse in response to each pulse generated on the Q1 output of four-bit binary counter 48. One such read command pulse is generated for every four conversion complete pulses. Thus, the read command pulses are generated at a rate twice as fast as that at which the write command pulses are generated.

So long as RS flip-flop 70 remains in its set state, data is entered into register 16a and stored and entered into register 16b and provided at its output 22b to D/A converter 50b.

Assuming initially that both fall-through registers are empty and digital signals are being removed only from fall-through register 16b, fall-through register 16a will become filled after 128 write command pulses, and a full flag pulse will be generated on its full flag output 30a in response thereto. This will cause RS flip-flop 70 to switch to its set state. When this occurs, input 76b of read control NOR gate 72b switches to a one state, and read control NOR gate 72b is thereby disabled from generating further read command pulses to register 16b. Register 16b then begins to fill with the second set of 128 words. While register 16b is being filled with the second set of 128 words, the first 128 words previously stored are clocked out of register 16a, and the second set of 128 words are clocked both into and out of register 16a.

When register 16b is filled, both the first and second 128-word sets have been clocked out of register 16a, a full flag pulse is generated on full flag output 30b, and RS flip-flop 70 again changes from its set state to its reset state. This again reverses the output roles of registers 16a and 16b, and register 16a begins to fill with the third 128-word set. While register 16a fills with the third set of 128 words, the second 128-word set is clocked out of register 16b, and the third 128-word set is clocked into and out of register 16b at twice the rate it is clocked into the register.

This process continues so long as digital signals are developed by A/D converter 36. Thus, each set of 128 words is repeated at the output, being first generated on the output of one of the registers and then generated on the output of the other register. The digital signals are clocked out of the registers at twice the rate they are clocked into the registers, and thus the frequency spectrum is doubled. The segments after being reconverted to analog signals by D/A converters 50a and 50b are fixed together by mixer amplifier 52 and provided on each of outputs 12 and 14 and converted to audible sound.

Reset pulses are of course generated each time one of the registers fills. With the analog rate changer operating at a x½ rate, each fall-through register is empty when the other is filled, and thus the reset pulse serves no function. However, if the analog rate changer is operated at a x¾ rate, for instance, which can be achieved when switch 78 is in the VARIABLE RATE position, the fall-through register providing output signals is not emptied when the other fall-through register is filled, and the remaining stored digital signals are cleared in response to the reset pulse. Specifically, when operating at a x¾ rate, only one-third of each 128-word segment is repeated, and the two-thirds of each 128-word segment remaining in the register providing output signals when the other fall-through register becomes filled, is cleared out of the register before the next 128-word set is received. As the read rate to write rate ratio approaches one, the portion of information that is repeated decreases to zero. There is of course no pitch change at the x1 rate.

With the rate control switch section in the x2 or x4 position, the analog rate changer is in a time compression mode in which the pitch of the input signal is lowered. In the time compression mode, data is alternately clocked into fall-through registers 16a and 16b and clocked out of the two registers simultaneously. The data is clocked into the registers at a rate greater than that at which it is clocked out of the registers. In the x2 position, data is clocked in at twice the rate at which it is clocked out of the registers and in the x4 position, data is clocked into registers 16a and 16b at four times the rate it is clocked out of the registers. Thus, the registers are alternately filled with data. Each time one of the registers fills with data, the other register is reset or cleared of all of the data stored therein, if any.

In the x2 position, all of the data clocked into the registers is clocked out of the registers, and in this sense no information is lost. Assuming initially that both registers 16a and 16b are empty and write gate 56a is enabled to clock in data to register 16a, a first and second set of 128 words will be clocked into register 16a while the first set is clocked out of register 16a into D/A converter 50a. After these two sets have been clocked into register 16a, i.e., after 256 write command pulses, register 16a will be filled and a full flag signal will be generated on its output 30a to cause RS flip-flop 70 to switch to its set state. The setting of RS flip-flop 70 disables write control NOR gate 56a to terminate entry of data into register 16a and enables write control NOR gate 56b to commence entry of data into register 16b. The setting of RS flip-flop 70 also generates a reset pulse which would clear register 16b if it contained any data. Third and fourth 128-word sets are then clocked into register 16b while the third set of data is clocked out of register 16b.

During the same period of time that the third set of data is clocked out of register 16b, the second set of data that was clocked into register 16a is clocked out of register 16a. At the end of this fourth time period, register 16b is filled, a full flag pulse is generated on output 30b, and as flip-flop 70 is reset. This terminates entry of data into register 16b and commences entry of data into register 16a. Fifth and sixth 128-word sets of data are then entered into register 16a while the fifth set of data is clocked out of register 16a. During this same time period, the fourth 128-word set, which had been clocked into register 16b, is clocked out of register 16b.

This process continues so long as data is available. Thus, it is seen that in the x2 mode, each channel continuously provides in succession every other pair of adjacent 128-word sets of data, thereby providing 50% of the total available information. Between the two registers, 100% of the total information clocked into the registers is clocked out of the registers and made available to the listener. One-fourth of this information is, however, presented in parallel as should be appreciated from the discussion above.

The analog signal from D/A converters 50a and 50b corresponding to the output signals from registers 16a and 16b may be connected to the mono inputs of mixer amplifier 52 and thereby combined into a single signal which may be provided on one or both of outputs 12 and 14. Alternately, because 100% of the information is available, mixing the two signals is not necessary to achieve a desirable output signal. The audio output may be presented to the stereo inputs with the output of D/A converters 50a and 50b being separately amplified through and coupled to outputs 12 and 14, respectively.

With the rate control switch sections in the x4 position, the operation of the analog rate changer is substantially the same as that when the switch sections are in the x2 position, with the exception that in the x4 position some information is lost during signal processing. Data is clocked out of both registers at the same absolute rate as when the rate control switch section is in the x2 position, and alternately clocked into registers 16a and 16b under control of RS flip-flop 70 and write control NOR gate 56a and 56b in the same manner as when operating at the x2 rate. Also, each of registers 16a and 16b is reset or cleared of all stored information each time the other register generates a full flag pulse.

However, when operating at the x4 rate, digital signals are clocked into the register at a rate four times faster than they are clocked out, which is two times faster than the rate at which the digital signals are clocked in when the analog rate changer is operating at the x2 rate. Thus, each channel fills sooner than when operating at the x2 rate, and when the reset pulse is generated, the other channel has not beem emptied of all of its information. The information remaining in the register when the reset pulse is generated is lost. Each register receiving input signals is filled after 4/3×128, or approximately 170-⅔, write command pulses. That is, one-third of 128 words are clocked out of each register while receiving information. Another one-third of 128 words are clocked out of each register while the other fall-through register is being filled. Thus, when the register receiving input signals has filled, the other register still retains one-third of the data previously entered, and thus one-third of the information is lost upon generation of the reset pulse.

Presuming initially that both registers are empty and register 16a is enabled to receive data, register 16a will fill in the time that it takes to clock out of register 16a two-thirds of its capacity. While four 42-⅔ word sets are being clocked into register 16a, the first set clocked in is clocked out, and register 16a is filled. When register 16a is filled, input data thereto terminates and entry of data into register 16b commences. Register 16b then fills in the same manner with four 42-⅔ word sets being clocked into the register while the first set is clocked out. During the time period that register 16b is being filled, the second set that had been clocked into register 16a is clocked out of register 16a. The third set which had been clocked into register 16a. The third set which had been clocked into register 16a thus remains in register 16a when the reset pulse is generated and this information is lost. While register 16a is again filled, the second word set which had been clocked into register 16b is clocked out of register 16b.

Data continues to be clocked into and clocked out or registers 16a and 16b in this fashion, so long as data is available at the inputs thereto. As can be appreciated, of the two-thirds or six-ninths of the information that is clocked out of the registers, two-ninths is clocked out in parallel and the remaining four-ninths is clocked out of the registers serially. It has been discovered, however, that this information is substantially as comprehensible as if all two-thirds of the information were serially clocked out of the registers.

When switch 78 is in the fixed rate position, the read and write command pulse signals are both synchronized with the conversion complete pulse. A particular advantage of this feature is that the sampling rate of A/D converter 36 may be varied by varying the frequency of the clock signal from variable clock generator 40 to optimize the output signal according to listener preference without effecting a change in the frequency spectrum alteration established by the analog rate changer.

As briefly discussed above, an important feature of the analog rate changer is that the ratio of write command pulses to conversion complete pulses decreases from 1 when in the x4 time compression mode to ⅛ when in the x½ expansion mode. When operating at the x4 rate, every digital word that is developed by A/D converter 36 is clocked into one or the other of registers 16a or 16b. At the x2 rate, every other digital word is clocked into the register. At the x1 rate, every fourth word is clocked into the register, and at the x ½ rate, every eighth word is clocked into the register.

Because of this feature, the write rate and read rate may be kept synchronized with one another at different selected ratios therebetween. The ratio of the write rate to the read rate may be selectively reduced by operation of rate control switch section 62 without reducing the sampling rate of the A/D converter 36. This avoids the reduction in accuracy of the A/D conversion which would be accompanied by a reduction in the conversion sampling rate. More importantly, as the time compression ratio is reduced, the accuracy of conversion effected by A/D converter 36 may be improved by increasing the frequency of variable clock 40. Further, by control of the conversion sampling rate, the time duration of discarded or lost segments at any of the lower write rate to read rate ratios may be selected for optimum audio output signal quality. Moreover, this selective variation of write rate relative to the conversion rate provides a greater range of control of ratios of variable clock 40 when switch 78 is in its variable rate position.

It should be appreciated that while the preferred embodiment of the analog rate changer employs only two fall-through registers, more than two fall-through registers could be usefully employed by controlling their input and output functions in succession in the same manner as described above with minor alteration in the circuitry described. Further, the use of synchronization and the disclosed system for selectively varying the ratios between the write rate and the read rate may be advantageously employed with an analog rate changer employing a single fall-through register, or even other types of registers.

We claim:
1. An analog rate changer comprising:
an input for receiving analog signals bearing information of which the frequencies thereof are a part;
an A/D converter for converting the analog input signals to corresponding digital signals;
a plurality of fall-through registers for storing the digital signals from said A/D converter;
write control means for successively entering the digital signals into the plurality of registers, the digital signals being entered into each register at a write rate, said write control means including means responsive to each register in the succession becoming filled to storage capacity with digital signals for terminating entry of digital signals thereinto, and means responsive to each register in the succession becoming filled to storage capacity with digital signals for initiating entry of digital signals to the next register in the succession;

read control means for continuously removing from all of the plurality of fall-through registers the digital signals stored therein, the stored digital signals being removed from said registers at a read rate less than said write rate; and means for converting the digital signals from the plurality of registers to corresponding analog output signals, said analog output signals bearing information substantially duplicative of that carried by the corresponding analog input signals and having frequencies proportionately less than the analog input signals corresponding thereto.

2. The analog rate changer of claim 1 including reset means responsive to each register being filled to storage capacity for generating a reset pulse coupled to the next register in the succession, each of said fall-through registers being cleared of any digital signal stored therein in response to a reset pulse being coupled thereto.

3. The analog rate changer of claim 2 including means for proportionately varying together said write rate and said read rate whereby the ratio of the write rate to the read rate may be maintained at a constant value while the absolute values of the rates are changed.

4. The analog rate changer of claim 3 including means for manually selecting said ratio, said proportionately varying means being operable to vary the absolute value of the write rate and the read rate while maintaining said selected ratio.

5. The analog rate changer of claim 3 in which said write control means includes means for generating periodic write command pulses at a frequency which establishes said write rate, said read control means includes means for generating periodic read command pulses at a frequency which establishes said read rate, and said proportionately varying means includes means for generating a clock signal, means for varying the frequency of the clock signal, and means for synchronizing generation of both said write command pulses and said read command pulses with said clock signal.

6. The analog rate changer of claim 5 in which said A/D converter samples successive time segments of said analog input signals and converts each of said sample segments to a representative digital signal at a rate proportional to the frequency of said clock signal.

7. The analog rate changer of claim 6 in which the digital signals are presented at an output means of the A/D converter and each digital signal being presented when a write command pulse is being generated is clocked into the one register in which the digital signals are being entered, and said write command pulse generating means generates said pulses at a rate less than that at which the digital signals are presented whereby less than all of the digital signals presented are entered into the register.

8. The analog rate changer of claim 7 including means for varying the ratio of the write command pulse frequency to the read command pulse frequency and means for varying the proportion of digital signals from the A/D converter that are clocked into a register in inverse relationship to the variation of said ratio.

9. The analog rate changer of claim 6 in which said A/D converter generates a conversion complete pulse when each digital signal is presented, and said synchronizing means includes a binary counter driven by said conversion complete pulses and having multiple outputs each generating output pulses at a different half multiple frequency of the conversion complete pulse frequency, said write command pulse generating means being responsive to the puses from a selected one of said binary counter outputs for generating said write pulses and said read command pulse generating means being responsive to the pulses from another selected one of said binary counter outputs for generating said read command pulse.

10. The analog rate changer of claim 2 in which said write control means includes means associated with each register for generating when enabled a periodic write command pulse at a frequency establishing said write rate, a digital signal being entered into a register only in response to a write command pulse from the associated write command pulse generating means, said terminating means includes means responsive to a register becoming filled to storage capacity for disabling the write command pulse generating means associated therewith, and said initiating means includes means responsive to one of said fall-through registers becoming filled for enabling the write command pulse generating means associated with the next fall-through register of the succession.

11. The analog rate changer of claim 10 in which said plurality of registers are two registers and said write control means includes a bistable multivibrator, said bistable multivibrator assuming one state in response to one of said two registers becoming filled to storage capacity and assuming a second state in response to the other register becoming filled to storage capacity, said terminating means including means for disabling the write command pulse generating means associated with the one fall-through register when the bistable multivibrator is in said one state, and disabling the write command pulse generating means associated with the other fall-through register when the bistable multivibrator is in said second state.

12. The analog rate changer of claim 11 in which said reset means includes means to clear the one fall-through register in response to said bistable multivibrator switching to said second state and means to clear the other fall-through register in response to said bistable multivibrator switching to one state.

13. The analog rate changer of claim 2 in which said plurality of fall-through registers are two fall-through registers, and said initiating means alternately initiates entry of the digital signals into the fall-through registers and said terminating means alternately terminates entry of digital signals into the two fall-through registers.

14. The analog rate changer of claim 2 including means for mixing the analog output signal from each of the plurality of registers into a single signal.

15. An analog rate changer comprising:

an input for receiving analog input signals bearing information of which the frequencies thereof are a part;

an A/D converter for converting the analog input signals to corresponding digital signals;

a pair of fall-through registers for storing the digital signals;

write control means for continuously entering the digital signals into both of the fall-through registers, said digital signals being entered into said fall-through registers at a write rate;

read control means for alternately removing the stored digital signals from the two registers, said stored digital signals being removed from each register at a read rate greater than said write rate, said read control means including means responsive to each of the fall-through registers becoming filled to storage capacity with digital signals for initiating removal of the digital signals therefrom and for terminating the removal of digital signals from the other register; and means for converting the digital signals removed from the two registers to analog output signals, said analog output signals bearing information substantially duplicative of that carried by said analog input signals corresponding thereto and having frequencies proportionately greater than the analog input signals corresponding thereto.

16. The analog rate changer of claim 15 including reset means responsive to each register being filled to storage capacity for clearing the other register of any digital signals sotred therein.

17. The analog rate changer of claim 16 including means for proportionately varying together said write rate and said read rate.

18. The analog rate changer of claim 17 in which said write control means includes means for generating periodic write command pulses at a frequency which establishes said write rate, said read control means includes means for generating periodic read command pulses at a frequency which establishes said read rate, and said proportional varying means includes
means for generating a clock signal,
means for varying the frequency of the clock signal, and
means for synchronizing generation of both said write command pulses and said read command pulses with said clock signal.

19. The analog rate changer of claim 18 in which said A/D converter samples successive time segments of said analog input signal and converts each of said sample segments into a representative digital signal at a rate porportional to the frequency of said clock signal whereby said sampling rate may be varied by varying said clock signal while maintaining the ratio of the read rate to the write rate at a constant value.

20. The analog rate changer of claim 19 in which the digital signals are presented at an output means of the A/D converter and each digital signal being presented when a write command pulse is generated is clocked into both of the registers, and said write command pulse generating means generates said pulses at a rate less than that at which the digital signals are presented whereby less than all of the digital signals presented are entered into the registers.

21. The analog rate changer of claim 19 including means for generating a periodic clock pulse, and manually operable switch means having one state in which said read command pulses are generated at a frequency porportional to that of the frequency of said clock pulse and another state in which said read command pulses are generated at a frequency which is synchronized with said clock signal of the proportional bearing means.

22. The analog rate changer of claim 15 including means for mixing together the analog output signals from the two registers to form a single output signal.

23. An analog rate changer comprising:
an input for receiving analog input signals bearing information of which the frequencies thereof are a part;

an A/D converter for converting the analog input signals to corresponding digital signals;

a pair of fall-through registers for storing the digital signals from said A/D converter, said fall-through registers receiving said digital signals at input means thereof and providing stored digital signals at output means thereof;

means for converting the digital signals provided at the respective output means of said pair of fall-through registers into corresponding analog output signals;

time contraction means for controlling the input and output of said pair of fall-through registers to develop an analog output signal corresponding to but having a lower frequency spectrum than said analog input signals including first write control means for alternately entering the digital signals into the pair of fall-through registers at a write rate, said digital signals being enetered into each register until the other fall-through register is filled to storage capacity with digital signals, and first read control means for simultaneously removing data from both of said registers at a first read rate less than said first write rate;

time expansion means for controlling the respective inputs and outputs of said pair of fall-through registers to develop analog output signals corresponding to but having a lower frequency spectrum than said analog input signals, including second write control means for continuously entering the digital signals into both of said pair of fall-through registers at a second write rate, and second read control means for alternately removing the stored digital signals in said pair of fall-through registers, said digital signals being removed from said registers at a second read rate greater than said second write rate, digital signals being removed from each register until the other one of the pair of fall-through registers has been filled to storage capacity with digital signals; and switch means for selectively rendering operative one of said time contraction means and said time expansion means.

24. The analog rate changer of claim 23 in which both of said time contraction and time expansion means include reset means responsive to one of said pair of fall-through registers becoming filled to storage capacity with digital signals to clear the other of said pair of fall-through registers of any digital signals stored therein.

25. An analog rate changer comprising:
an input for receiving analog signals bearing information of which the frequencies thereof are a part;

an A/D converter for converting the analog input signals to corresponding digital signals at a conversion sampling rate;

a memory for storing the digital signals from the A/D converter;

means for clocking the digital signals into the register at one rate;

means for clocking stored digital signals out of the memory at another rate different from said one rate;

means for synchronizing both the one rate and the other rate with the conversion sampling rate of the A/D converter;

means for varying the sampling rate of the A/D converter; and means for reducing the one rate relative to the other rate by reducing the one rate relative to the conversion sampling rate whereby the proportion of digital signals developed by the A/D converter which are clocked into the memory is reduced as the ratio of the one rate to the other rate is reduced.

* * * * *